United States Patent
Abraham et al.

(10) Patent No.: US 11,188,519 B2
(45) Date of Patent: *Nov. 30, 2021

(54) AUTOMATED INTELLIGENT DATA SCRAPING AND VERIFICATION

(71) Applicant: BEST COLLECT, S.A. de C.V., Mexico City (MX)

(72) Inventors: Gabriel Díaz Garza Abraham, Mexico City (MX); Ricardo Suárez López, Mexico City (MX)

(73) Assignee: BEST COLLECT, S.A. de C.V., Mexico, Mexico City (MX)

(*) Notice: Subject to any disclaimer, the term of this patent is extended or adjusted under 35 U.S.C. 154(b) by 141 days.

This patent is subject to a terminal disclaimer.

(21) Appl. No.: 16/662,964

(22) Filed: Oct. 24, 2019

(65) Prior Publication Data
US 2020/0057759 A1 Feb. 20, 2020

Related U.S. Application Data

(63) Continuation of application No. 14/619,751, filed on Feb. 11, 2015, now Pat. No. 10,489,377.

(51) Int. Cl.
*G06F 16/23* (2019.01)
*H04L 29/08* (2006.01)
(Continued)

(52) U.S. Cl.
CPC ........ *G06F 16/2365* (2019.01); *G06F 16/951* (2019.01); *G06F 40/205* (2020.01);
(Continued)

(58) Field of Classification Search
CPC ............... G06F 16/2365; G06F 16/951; G06F 17/30371; G06F 17/30864; G06F 40/205; G06Q 10/00; G06Q 10/10; H04L 67/02
See application file for complete search history.

(56) References Cited

U.S. PATENT DOCUMENTS 7,254,569 B2 * 8/2007 Goodman ............. G06F 40/174
7,343,551 B1 * 3/2008 Bourdev ............... G06F 40/174
   715/224

(Continued)

FOREIGN PATENT DOCUMENTS

EP      1777629       4/2007
JP    2005316534     11/2005
(Continued)

OTHER PUBLICATIONS

Couch, Aaron; "Kill the Tedium of Online Forms with These 10 Great Autofill Tools"; Sep. 22, 2012; http://www.makeuseof.com/tag/kill-the-tedium-of-online-forms-with-these-10-great-autofill-tools/.

(Continued)

*Primary Examiner* — Robert W Beausoliel, Jr.
*Assistant Examiner* — Susan F Rayyan
(74) *Attorney, Agent, or Firm* — Workman NyDegger

(57) ABSTRACT

A server computer system for parsing non-uniformly presented data from a variety of unique non-uniform third-party web portals can comprise a scripting processor configured to automatically execute a web-portal specific script for each of the one or more third-party web portals accessed by a network communication device. Each of the web-portal specific scripts can be configured to imitate inputs from a user input device and to automatically adapt interactions with each of the one or more third-party web portals to access and parse data elements from one or more non-uniformly available data fields. Further, the server computer system can comprise a database processor configured to compare a first set of data received from the one or more non-uniformly available data fields with a second set of data, which is stored within the local database device.

20 Claims, 5 Drawing Sheets

(51) Int. Cl.
  *G06F 16/951* (2019.01)
  *G06Q 10/00* (2012.01)
  *G06Q 10/10* (2012.01)
  *G06F 40/205* (2020.01)
(52) U.S. Cl.
  CPC ............. *G06Q 10/00* (2013.01); *G06Q 10/10* (2013.01); *H04L 67/02* (2013.01)

(56) References Cited

U.S. PATENT DOCUMENTS

| | | | |
|---|---|---|---|
| 7,561,734 | B1 | 7/2009 | Wnek |
| 7,660,779 | B2 | 2/2010 | Goodman et al. |
| 7,761,787 | B2 | 7/2010 | Singleton et al. |
| 8,032,823 | B2 | 10/2011 | Tomasic et al. |
| 8,214,362 | B1 | 7/2012 | Djabarov |
| 8,234,561 | B1 | 7/2012 | Bourdey |
| 8,539,335 | B2 | 9/2013 | Febonio et al. |
| 8,566,699 | B2 | 10/2013 | Tomasic et al. |
| 8,595,230 | B1 | 11/2013 | Djabarov |
| 8,713,029 | B2 | 4/2014 | Velusamy |
| 8,850,304 | B2 | 9/2014 | Ye et al. |
| 9,741,059 | B1 | 8/2017 | Rukonic |
| 10,489,377 | B2 * | 11/2019 | Abraham ................ H04L 67/02 |
| 10,984,003 | B2 * | 4/2021 | Jetcheva ............. G06F 16/9035 |
| 2002/0083068 | A1 | 6/2002 | Quass et al. |
| 2006/0200754 | A1 | 9/2006 | Kablesh et al. |
| 2008/0172598 | A1 | 7/2008 | Jacobsen et al. |
| 2010/0179962 | A1 | 7/2010 | Schuster |
| 2010/0205529 | A1 * | 8/2010 | Butin ....................... G06F 9/453 715/704 |
| 2010/0205530 | A1 * | 8/2010 | Butin ....................... G06F 9/453 715/715 |
| 2013/0136253 | A1 | 5/2013 | Liberman Ben-Ami |
| 2013/0212083 | A1 * | 8/2013 | Beattie .................. G06F 16/951 707/707 |
| 2013/0346302 | A1 | 12/2013 | Purves et al. |
| 2014/0122988 | A1 | 5/2014 | Eigner et al. |
| 2014/0122989 | A1 | 5/2014 | Eigner et al. |
| 2015/0019327 | A1 | 1/2015 | Mazumdar et al. |
| 2016/0232194 | A1 * | 8/2016 | Abraham ................ H04L 67/02 |
| 2017/0103102 | A1 | 4/2017 | Alison |
| 2017/0104841 | A1 | 4/2017 | Duke |

FOREIGN PATENT DOCUMENTS

| | | |
|---|---|---|
| JP | 2006048144 | 2/2006 |
| WO | 2011157901 | 12/2011 |
| WO | 2016129984 | 8/2016 |

OTHER PUBLICATIONS

Pash, Adam;"How to Automatically Fill in Repetitive Web Forms (and Avoid Tons of Tedious Typing)"; Sep. 7, 2011; http://lifehacker.com/5837922/automatically-fill-in-repetitive-web-forms.
Dashlane, Inc; Free Form Fill Application-Autofill Forms with Dashlane; Dec. 2014; https://www.dashlane.com/autofill.
Add-ons for Firefox; Autofill forms; Dec. 2014; https://addons.mozilla.org/en-US/firefox/addon/autofill-forms/.
Selenium Project, "Selenium Documentation; Release 1.0" Feb. 24, 2010, 164 pages, XP055214281.
Bellur "Extract and Verify the Text From Image Using Selenium WebDrive" Automation Ace, Apr. 16, 2014, URL: http://www.automationace.com/2014/extract-and-verify-text-from0images-using-selenium-webdriver.html.
Yan et al, "Breaking Visual CAPTCHAs with Native Pattern Recognition algorithms," ACSAC 2007, IEEE Dec. 1, 2007, pp. 279-291.
European Search Report for EP15170582.9 dated Sep. 15, 2015.
Fotios Kokkoras et al: "DEiXTo", Proceedings of the 6$^{th}$ Balkan Conference in Informatics on, BCI'13, Jan. 1, 2013 (Jan. 1, 2013), pp. 9-12, XP055293698, New York, New York, USA DOI: 10.1145/2490257.2490297 ISBN: 978-1-4503-1851-8.
International Search Report for PCT/MX2015/000069 dated Sep. 16, 2015.
Juliano Palmieri Lage et al: "Automatic generation of agents for collecting hidden Web pages for data extraction" Data & Knowledge Engineering, vol. 49, No. 2, May 1, 2004 (May 1, 2004), pp. 177-196, XP055293701, NL ISSN: 0169-023X, DOI: 10.1016/j.datak.2003.10.003.
Oral Proceedings for EP15170582.9 dated Apr. 18, 2018.
Ryan Mitchell: "Instant Web Scraping with Java", Aug. 1, 2013 (Aug. 1, 2013), XP055293710, ISBN: 978-1-84969-688-3 [retrieved on Aug. 4, 2016].
Paul Hogan: "Using Python and Selenium to scrape an infinitely scrolling table", paulhoganreid.wordpress.com, Jan. 19, 2015 (Jan. 19, 2015), XP055466722, retrieved from the Internet: URL: <https://paulhoganreid.wordpress.com/2015/01/19/using-python-and-selenium-to-scrape-an-infinitely-scrolling-table/> [retrieved on Apr. 12, 2018].
U.S. Appl. No. 14/619,751, Apr. 5, 2018, Non-Final Office Action.
U.S. Appl. No. 14/619,751, Sep. 19, 2018, Final Office Action.
U.S. Appl. No. 14/619,751, Apr. 10, 2019, Notice of Allowance.
U.S. Appl. No. 14/619,751, Apr. 24, 2019, Supplemental Notice of Allowability.
U.S. Appl. No. 14/619,751, Jul. 31, 2019, Notice of Allowance.

\* cited by examiner

AUTOMATED INTELLIGENT DATA SCRAPING AND VERIFICATION

CROSS-REFERENCE TO RELATED APPLICATIONS

This application is a continuation of U.S. patent application Ser. No. 14/619,751 filed on Feb. 11, 2015 and entitled "AUTOMATED INTELLIGENT DATA SCRAPING AND VERIFICATION," which application is expressly incorporated herein by reference in its entirety.

BACKGROUND OF THE INVENTION

1. Technical Field

The present invention relates generally to data scraping from web portals and verification of the data.

2. Background and Relevant Art

In an effort to streamline productivity and to combat fraud, many countries are moving towards mandating electronic invoicing. In many cases, government mandated invoicing requires companies, and sometimes individuals, to register invoices through a government entity. The registered invoices can be digitally signed, or otherwise authenticated.

Additionally, in some cases to mandate the use of electronic invoicing, only electronically registered invoices will be legally valid. As such, companies are highly motivated to ensure that invoices are properly registered. Similarly, companies are highly motivated to ensure that the registered invoices are correct and complete in order to avoid problems with invalid invoices.

When processing payments and invoices, companies are often required to perform complex, error-prone tasks in order to access and verify the various invoices. For example, in order to access invoices, a purchaser may be required to access a provider's web portal. Each web portal from each provider may be unique and complex. Additionally, each web portal may provide the invoices information in a different, unique format. As such, the purchaser must identify the proper way to navigate each unique website and individually verify that the necessary invoices and documents are downloaded. The purchaser must then verify the downloaded invoices and documents against their own records.

Additionally, in at least some implementations, it is necessary to upload invoices to a web portal and verify the invoice entries. For example, an invoice provider may be required to upload and validate an invoice against a related purchase order. It may be further necessary for the invoice provider to address any discrepancies between the invoice and the purchase order before the invoice can be processed.

Further, in at least one implementation, a user may be limited to a short time window during which invoices can be uploaded. For example, an invoice provider may only have a two-hour window to enter all of the day's invoices. Failure to enter the information can create an ongoing backlog into the next day or result in failure to timely collect money.

Accordingly, there are a number of disadvantages in the art that can be addressed.

BRIEF SUMMARY OF THE INVENTION

Implementations of the present invention comprise systems, methods, and apparatus configured to intelligently scrape data from a web portal and then verify the data. In particular, implementations of the present invention comprise one or more methods and systems for executing web-page specific scripts for gathering data. The webpage specific scripts can provide highly efficient means for gathering large amounts of data from diverse sources. Additional implementations can provide a dynamic system for completing web forms, uploading information, and validating information. Additionally, implementations of the present invention can significantly reduce human-caused errors and provide significant time savings when validating large amounts of data.

Implementations of the present invention can include a server computer system that intelligently loads and verifies data in non-uniform formats against a second set of data. In particular, the server can be configured to execute a computerized method for accessing and comparing non-uniformly stored data sets. The method can comprise identifying, within one or more data structures, specific data entries of interest. The one or more data structures may be stored within a first locally accessible database. The method can also comprise accessing a particular third-party web portal. The particular third-party web portal can comprise information associated with the one or more data structures.

Additionally, the method can comprise executing a particular script that is unique to the particular third-party web portal. The particular script can be configured to interact with the particular third-party web portal by imitating inputs from a user input device. Additionally, the script can automatically adapt interactions with the particular third-party web portal to access and parse data elements from one or more non-uniformly available data fields.

Further, the method can comprise comparing a first set of data received from the one or more non-uniformly available data fields with the second set of data. The second set of data can be stored within a second locally accessible database. The method can also comprise generating a report based upon the compared data. The report can comprise notifications of discrepancies between the first set of data and the second set of data.

Additional implementations of the present invention can include a server computer system for parsing non-uniformly presented data from a variety of unique non-uniform third-party web portals. The computer server system can comprise a local database device that contains addresses to one or more third-party web portals. The server computer system can also comprise a network communication device that is configured to automatically access the one or more third-party web portals.

Additionally, the server computer system can comprise a scripting processor configured to automatically execute a web-portal specific script for each of the one or more third-party web portals accessed by the network communication device. Each of the web-portal specific scripts can be configured to interact with each of the one or more third-party web portals by imitating inputs from a user input device. Additionally, the web-portal specific scripts can be configured to automatically adapt interactions with each of the one or more third-party web portals to access and parse data elements from one or more non-uniformly available data fields.

Further, the server computer system can comprise a database processor configured to compare a first set of data received from the one or more non-uniformly available data fields with a second set of data, which is stored within the local database device. Further still, the computer server system can comprise a user output device configured to display a report based upon the compared data. The report comprises notifications of discrepancies between the first set of data and the second set of data.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to systems, methods, and apparatus configured to intelligently scrape data from a web portal and then verify the data. In particular, implementations of the present invention comprise one or more methods and systems for executing web-page specific scripts for gathering data. The webpage specific scripts can provide highly efficient means for gathering large amounts of data from diverse sources. Additional implementations can provide a dynamic system for completing web forms, uploading information, and validating information. Additionally, implementations of the present invention can significantly reduce human-caused errors and provide significant time savings when validating large amounts of data.

Accordingly, implementations of the present invention provide systems and methods for optimizing computer performance while minimizing human-introduced error. In particular, implementations of the present invention can access non-uniformly stored data across a variety of different platforms. The gathered data can then be validated against a second data source.

As more and more social, economic, business, technical, and other activities move to a digital environment, it is becoming more important to be able to correctly correlate data across the various available platforms. For example, an organization may have dealings with a variety of different companies. Each company may provide its own unique web portal to manage its relationships with outside organizations. In at least one implementation, it may be necessary to access each respective unique web portal and gather non-uniformly stored data from each unique web portal.

One will understand the significant technical challenges of properly identifying and gathering the non-uniformly stored data from several different unique web portals. Similarly, one will understand the tremendous cost and likelihood of human error in manually performing these tasks. Additionally, one will understand that in at least one implementation, the use of automation and technically implemented systems and methods to access the non-uniformly stored data can provide benefits and perform functions that a human user would be unable to replicate.

Figure 1:
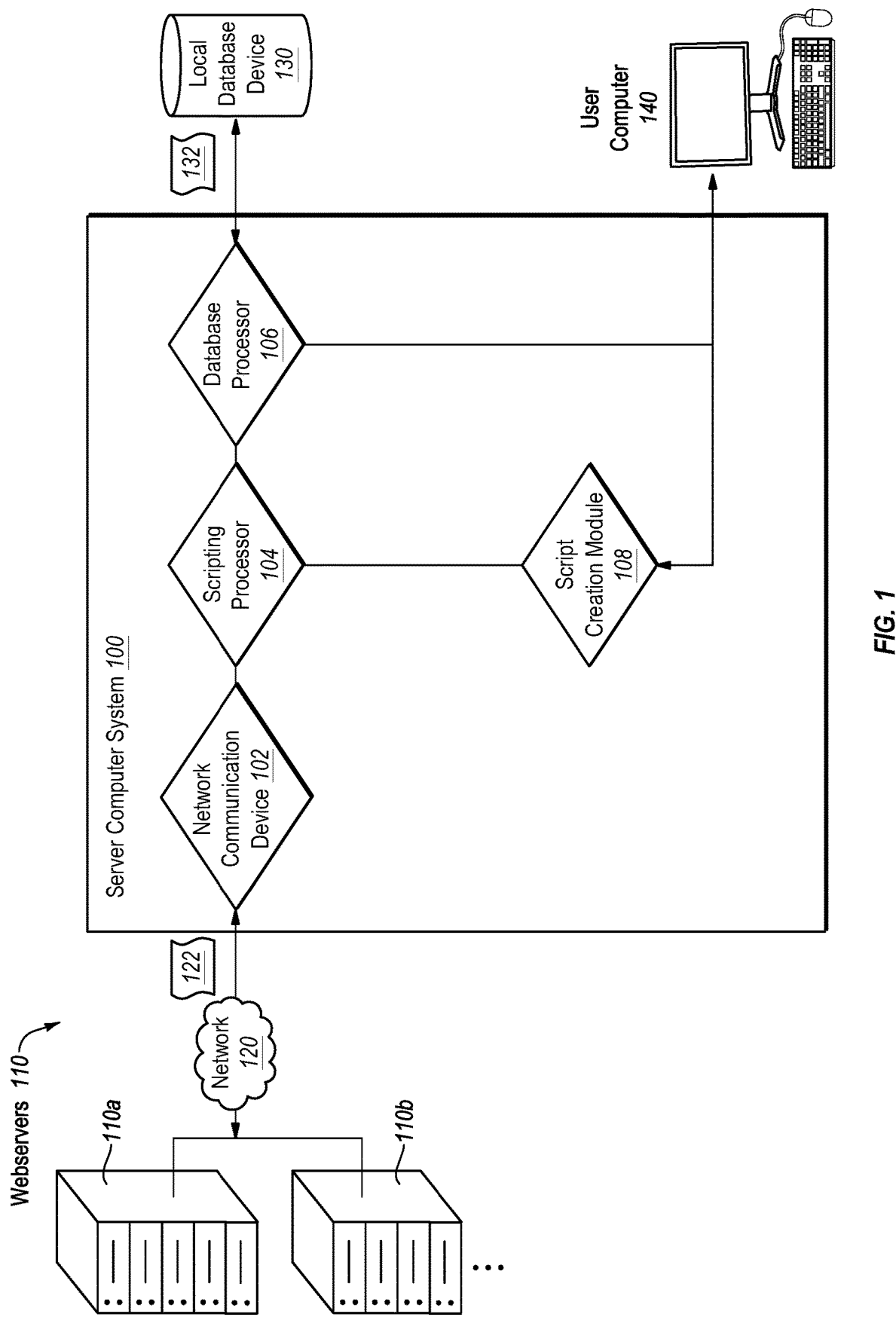
FIG. 1 illustrates a schematic diagram of a system in accordance with implementations of the present invention.

For example, FIG. 1 depicts a server computer system 100 in communication with various webservers 110 through a network 120. The webservers 110 may comprise one or more individual and distinct webservers 110a, 110b that each correspond to respective third-party web portals. For example webserver 110a may be associated with a particular services provider, while webserver 110b may be associated with a particular manufacturer. In any case, a user may need to gather data from both servers 110a, 110b; however, the data may be accessed differently and stored differently between the two respective web portals.

Accordingly, implementations of the present invention comprise a server computer system 100 that can communicate with one or more distinct Web servers 110 through the network connection 120. Additionally, the server computer system 100 can comprise various modules and components, as described herein, that are configured to access data across unique web portals and validate the data against locally accessible data sets. One will understand, however, that the modules and components described herein are merely for the purpose of clarifying an explanation. In various other implementations, the modules and components maybe otherwise organized, combined, divided, and named.

The server computer system 100 can comprise a network communication device 102 that is in communication with network 120. In various implementations, the network communication device 102 can comprise a fiber adapter, an Ethernet adapter, a wireless adapter, a modem, a router, or any other similar network device. The network communication device 102 may be in communication with the scripting processor 104.

In at least one implementation, the scripting processor 104 can be configured to execute various scripts and other software as determined by the user in the server computer system 100. In various implementations, the scripting processor 104 can comprise a general-purpose processing unit, a special purpose processing unit, a microcontroller, an FPGA, a discrete integrated circuit, a virtual processor, or some other processing device or component. The scripting processor 104 may also comprise various software components such as a compiler, an encoder, a packager, an assembler, or some other similar software component.

In addition, in at least one implementation, the scripting processor 104 also communicates with a database processor 106 and the script creation module 108. In at least one implementation, the database processor 106 can comprise the same processor as a scripting processor 104, a distinct processing unit, a processing unit on a computer that is separate from the computer containing the scripting processor 104, or some other processing unit. Similarly, the script creation module 108 can also comprise the same processor as the scripting processor 104, or it can comprise a distinct processing unit or computer component.

In various implementations, the server computer system 100 may also be in communication with a local database device 130 and a user computer 140. The local database device 130 may comprise data structures stored on a storage device, such as a hard drive, RAM, or other storage device. The user computer 140 may comprise the same computer in which the server computer system 100 is executing, an external computing device, a mobile computing device, a tablet computer computing device, a workstation, a server, or any other computing device.

In at least one implementation, the various modules of the server computer system 100 can access and download non-uniformly stored data from the various webservers 110 and validate the information against corresponding data stored in the local database device 130. In particular, the server computer system 100 can automatically adapt to access the non-uniformly stored data across a variety of different web portals. For example, due to the large number of potential webservers 110 and the corresponding large number of unique webpage and web portal configurations, in at least one implementation, the server computer system 100 can comprise a unique script for each desired web portal. In particular, the scripting processor 104 can automatically load an appropriate script that corresponds with the web portal that the network communication device 102 is attempting to contact. Each unique script can comprise instructions for the network communication device 102 to communicate to the respective web servers 110. For instance, one or more webservers 110 may require a username and password in order to access the data of interest. Similarly, each web portal may comprise a unique structure that requires specific navigation instruction in order to access the desired information.

Accordingly, in at least one implementation, scripts can be created for each individual web page and web portal that direct the server computer system 100 to gather the desired information. In at least one implementation, the script creation module 108 provides the user with the appropriate tools to create a script. For example, the script creation module 108 can provide a record function. Using the record function, a user on the user computer 140 can access the desired web portal, navigate the web portal, and identify specific items of interest within the web portal. The specific items of interest may comprise non-uniformly stored data, buttons, actions necessary to access the data, and fields necessary to access the data.

Once a user has finished creating a script, the script creation module 108 can provide the script to the scripting processor 104. The scripting processor 104 may then store the script within the local database device 130. In the future, whenever the web portal that the script is associated with is accessed, the scripting processor 104 can automatically access the script, execute the script, and navigate the webpage—based upon the previously recorded interactions of the user.

In addition, in at least one implementation, multiple, different scripts may be associated with a particular web portal. The scripting processor 104 may select a particular script to execute with a web portal, not only based upon the specific web portal being accessed, but also based upon the data being sought within the web portal. For example, a first client may require a special script to access data of interest from a web portal, while a second client may desire different or additional information from the web portal. As such, the first client and the second client may have different scripts for the same web portal. When accessing the web portal, the scripting processor 104 may first determine what client's data is being accessed and then execute the proper script based upon that determination.

Once the necessary data 122 has been received from the webservers 110, the database processor 106 can compare it to a second data set 132 that is received from the local database device 130. For example, the two datasets may comprise information relating to invoiced inventory versus shipped inventory. As such, the database processor 106 can quickly and easily identify discrepancies between the two data sets.

Figure 2:
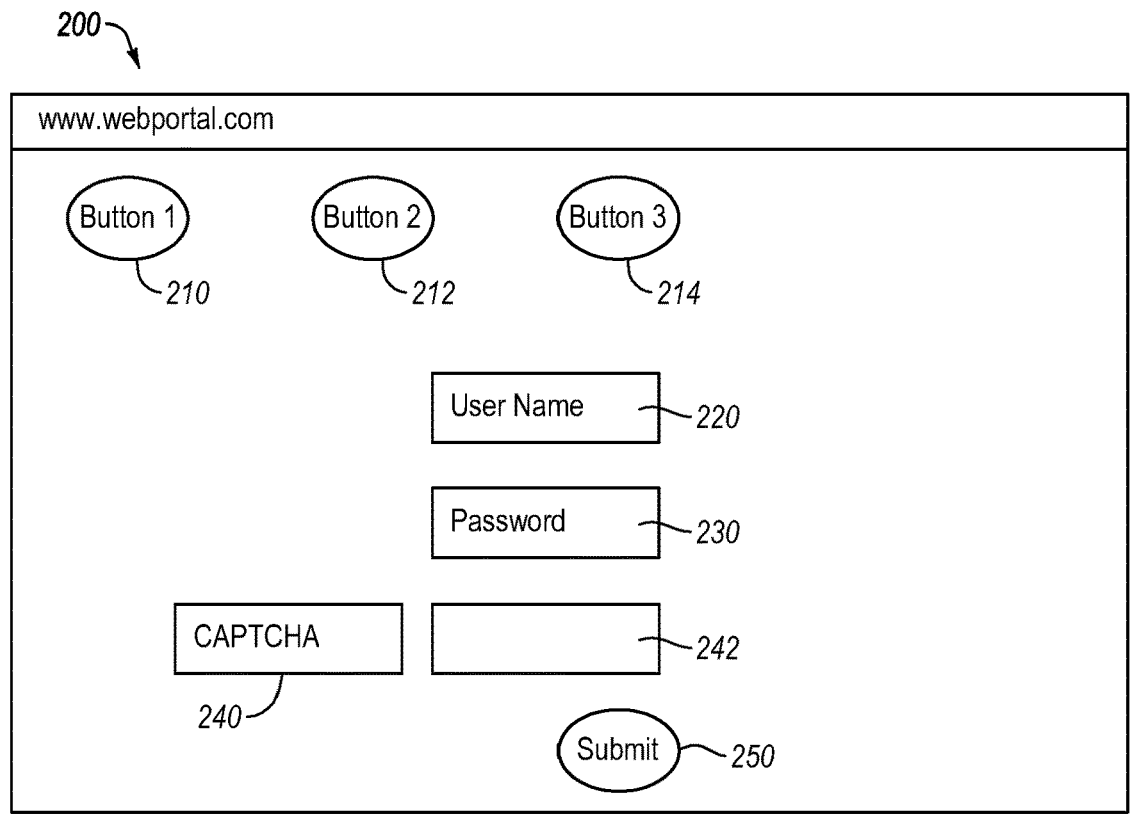
FIG. 2 illustrates a depiction of a webpage in accordance with implementations of the present invention.

Turning now to an example of a web portal, FIG. 2 depicts a webpage 200 for a specific web portal. The web portal may be hosted by Web server 110*a*. As depicted, webpage 200 comprises a series of buttons 210, 212, 214, a username field 220, a password field 230, a CAPTCHA box 240, a CAPTCHA user field 242, and a submit button 250. In at least one implementation, when arriving to webpage 200 for the first time, a user must generate a script to indicate how the webpage should be navigated. For example, the user can activate a record function within the script creation module 108 and record the real-time movements with the webpage. In at least one implementation, the user may be required to activate button 210 prior to entering their username and password. As such, within recording mode, the script creation module 108 can record the movement of the mouse cross across the screen to button 210 and then record the mouse clicking on the button 210.

Additionally, the script creation module 108 can identify the user moving the mouse to the username field 220 and the entry of the user name within the field. Similarly, the script creation module 108 can record the mouse moving to the password field 230 and entering a user password. In at least one implementation, within the recording mode, the user can designate the username and password as special objects. Once designated as a special object, the script creation module 108 can determine that the script should not merely repeat the exact username and password that the user entered, but should instead seek out a case-specific username and password. For example, the server computer system 100 may have multiple users accessing the same webpage 200. Each user may have a unique username and password. As such, in at least one of implementation, the script can be configured to automatically input the correct username and password based upon who is requesting the data.

Similarly, at least one implementation, within the recording mode, the user can designate the CAPTCHA phrase 240 as a special object. When designating an item as a special object, the user can designate what type of special object it is. For example, a username, a password, a CAPTCHA phrase, a button, or other similar webpage-based features. In contrast, in at least one application, the scripting creation module 108 automatically identifies both the special objects and the type of object.

For example, in at least one implementation, an optical character recognition module (not shown) can scan a webpage for any text within images. The optical character recognition module can then identify the text and send it to the script creation module 108. The script creation module 108 can analyze the received text and other available webpage text to automatically identify various special elements within the webpage. The script creation module 108 can then map the identified special elements to particular data fields within the local database device 130.

For instance, the optical character recognition module may identify an image header that includes the word "password." The image header may be directly adjacent to a text field. Based upon this information, the script creation module 108 can create a script that associates the adjacent text field with a password special element. As such, when the script is executed in the future, the scripting processor 104 can automatically fill the text field with the appropriate password.

Additionally, in at least one implementation, the script creation module 108 can identify that a particular field comprises a security parameter. For example, a particular field may be configured to receive text, but to display a corresponding circle character instead of the actual received text. Using this information, the script creation module may more definitely be able to identify the password field. In particular, in some cases, the password field and the username field are near each other. The ability to identify that one field comprises a security parameter (as is often the case with password fields), while the other field does not comprise the security parameter (as is often the case with username fields), can allow the script creation module 108 to distinguish between the password field and the username field.

Additionally, the user can associate CAPTCHA user field 242 with the CAPTCHA phrase 240. Accordingly, the scripting processor 104 can activate the optical character recognition module on the special object capture 240, identify the phrase, and input the phrase within the CAPTCHA user field 242. In at least one implementation, if the optical character recognition module is unable to identify the CAPTCHA phrase with a high enough rate of confidence, the scripting processor 104 can automatically request another CAPTCHA phrase or can request user intervention. In contrast, in at least one implementation, the scripting processor 104 can analyze the underlying code of the CAPTCHA and identify the proper way to respond.

One will understand that there are a variety of different formats and configurations that webpages can comprise different from those depicted herein. In at least one implementation, however, due to the script creation module 108, the server computer system 100 can automatically and without human error access nearly any webpage 200. As such, data can be gathered from various different web portals in a consistent, fast, and less-error prone way.

Figure 3:
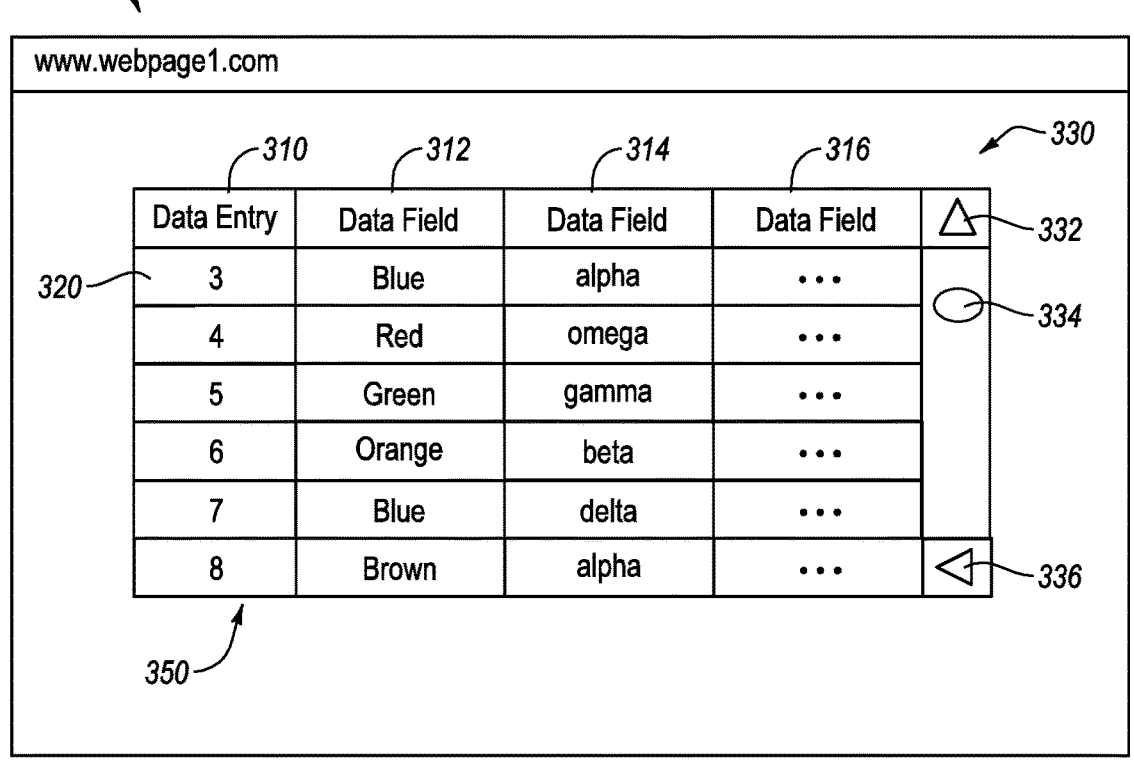
FIG. 3 illustrates another depiction of a webpage in accordance with implementations of the present invention.

FIG. 3 depicts a webpage 300 comprising a non-uniformly stored data set 350. The dataset 350 comprises the data entry column 310, a first data field column 312, a second data field column 314, and a third data field column 316. Additionally, the webpage 300 comprises a scrollbar 330 with an up scroll 332, a down scroll 336, and a scroll location indicator 334. The various data entries 310, data fields 312, 314, 316, and data elements 320 depicted in FIG. 3 are provided only for the sake of clarity and explanation. One will understand that the non-uniformly stored data may be provided in a variety of different forms and times and still fall within the scope of the present invention.

In at least one implementation, upon accessing the non-uniformly stored data 350 of FIG. 3, the entire dataset 350 may be available within local memory, even though it is not all simultaneously depicted within the webpage. For example, even though some of the data needs to be scrolled to in order to be visible, the entire dataset may be available within the local memory of the browser. In such a case, the scripting processer 104 can gather the data of interest directly from the network communication device 102, without requiring additional interaction with the non-uniformly stored data 350.

In contrast, in at least one implementation, upon accessing the non-uniformly stored data 350 of FIG. 3, a user within the recording mode can indicate that the non-uniformly stored data 350 comprises target information. Upon identifying target information, the script creation module 108 can determine whether all of the target information is currently with the local memory of the network communication device 102 or if it is necessary to further interact with the webpage in order to access the entire information set. For example, in at least one implementation, only the data displayed on the webpage 300 may be available within memory. As such, while using the record mode, the user can indicate the presence of the scrollbar 330. In contrast, in at least one implementation, the script creation module 108 can automatically identify the presence of the scrollbar 330. In alternate implementations, the script creation module 108 can automatically analyze a webpage and determine based upon the source code whether all of the available data is within memory and if it is not, the necessary steps for retrieving the information.

Once the script creation module 108 has identified that it is necessary to interact with the webpage 300 to access all of the data, the script creation module 108 can create a webpage specific script. The webpage specific script can be configured to parse the currently displayed data on the webpage 300, and then interact with the webpage 300 to advance the display data. For example, the script can generate a user input signal, as if generated by a mouse or keyboard, and cause the down scroll button 336 to be pressed. As the non-uniformly stored data 350 scrolls, the script can continue to parse newly visible data entries from the webpage until all the data entries have been parsed.

In at least one implementation, the script can be configured using a variety of different logical functions. For example, the script can be configured to direct the script processor 104 to identify the relative presence of the scroll indicator 334 on the scroll bar 330. Using this relative location, the script can be configured to direct the script processor 104 and determine whether it is necessary to scroll up or to scroll down in order to access additional data entries 320. In contrast, the script can be configured to direct the script processor 104 to automatically activate the up scroll button 332, then to determine whether new data entries are available. If no new data entries are available, the script can further be configured to direct the script processor 104 to active the scroll down button 336 and then parse any newly available data entries. The script can be configured to direct the script processor 104 to continue to activate the scroll down button 336 and parse newly available data entries 320 until no new data entries appear.

Accordingly, in at least one implementation, a single webpage specific script can be generated to parse target data from the webpage 300 even if the data 350 is of indeterminate length and visibility. For instance, in at least one implementation, even though the webpage 300 of FIG. 3 is still capable of displaying scrollable data, there may not be a sufficient quantity of data for a scroll function to be required. In contrast, in at least one implementation, significant scrolling may be required to access all of the data. In both cases, the scripting processor 104 executing a webpage specific script can properly identify the necessary actions to gather all of the target data.

Additionally, in at least one implementation of the present invention, the server computer system 100 can be used to upload data into a web portal. For example, as described above, a user within the recording mode can interact with a webpage as described above. In this case, however, the user can demonstrate the methods for uploading data into a webpage. One of skill the art will understand how the above disclosure can be applied to generating automatic scripts that are configured to automatically upload data to web portals of interest.

In at least one implementation, once a script has been created, the script can be activated to automatically upload data stored in the local database device 130. For example, a particular user may have one or more invoices stored within the local database device. In at least one implementation, each invoice is associated with a different target website. A particular script can be generated that automatically identifies the specific webpage that each invoice is associated with. For instance, the script can be configured to access a data file that associates each invoice with a respective webpage.

Once the appropriate webpage or webpages are identified, the scripting processor 104 can execute the appropriate scripts that are associated with each webpage. The scripting processor 104 can then upload the data as directed by the respective script. In particular, the script can direct the scripting processor to move a mouse, execute key presses, and perform other common user interface functions such that it appears that a user is entering the data.

Figure 4:
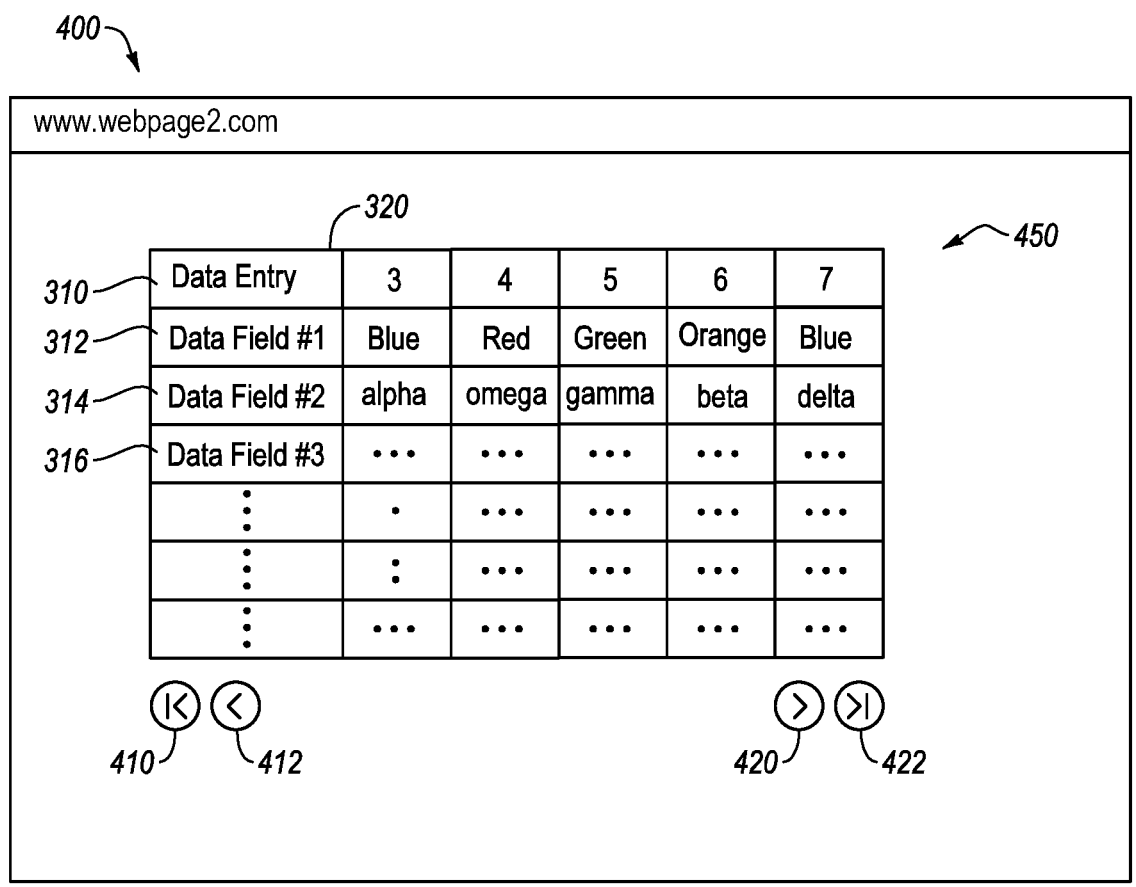
FIG. 4 illustrates yet another depiction of a webpage in accordance with implementations of the present invention.

FIG. 4 depicts another implementation of a webpage 400 comprising non-uniformly stored data 450. In particular, the non-uniformly stored data 450 comprises the same data entries 310 and data fields 312, 314, 316 as FIG. 3. The similarity is provided for the sake of clarity and in practical use may not be the case.

The non-uniformly stored data 450 of FIG. 4 comprises a different structure than the same data stored within the non-uniformly store data 350 of FIG. 3. Additionally, the webpage 400 of FIG. 4 does not comprise a scrollbar, but instead, comprises page buttons 410, 412, 420, 422. Similar, to the script creation of FIG. 3, in at least one implementation, using the record function, a user can indicate that the page buttons 410, 412, 420, 422 comprise special objects.

Additionally, in at least one implementation, the script creation module 108 can automatically determine that the special objects 410, 412, 420, 422 are used to advance the data structure 450. In contrast, in at least one implementation, using the record function, a user can demonstrate to the script creation module 108 that the page buttons 410, 412, 420, 422 cause the non-uniformly stored data to advance pages.

In at least one implementation, upon designating the page buttons 410, 412, 420, 422 as special objects, the user must further designate to the script creation module 108 the function of each object. For example, the script creation module 108 may provide menus of pre-determined functions that the user can associate with each special object. For instance, a menu option may be available for "page advance button." The user can designate page button 420 as a special object, and then within a menu designate page button 420 as a "page advance button."

As such, in at least one implementation, the scripting processor 104 can execute a web-page specific script and automatically determine whether it is necessary to interact with the webpage 400 of FIG. 4 in order to access all of the targeted data. In particular, the scripting processor 104 can execute the same web-page specific script on the webpage 400 of FIG. 4, regardless of the data that is present within the non-uniformly stored data set 450. For example, in a first case the non-uniformly stored data set 450 may comprise large quantities of data for a first client, while in a second case the non-uniformly stored data set 450 may comprise less than a single page of data for a second client.

Accordingly, implementations of the present invention provide web-page specific scripts and methods for creating the same. The web-page specific scripts can be used for any number of different data requests directed towards the specific webpage 300, 400. As such, high levels of efficiency can be achieved and significantly reduced human introduced error can be achieved.

Figure 5:
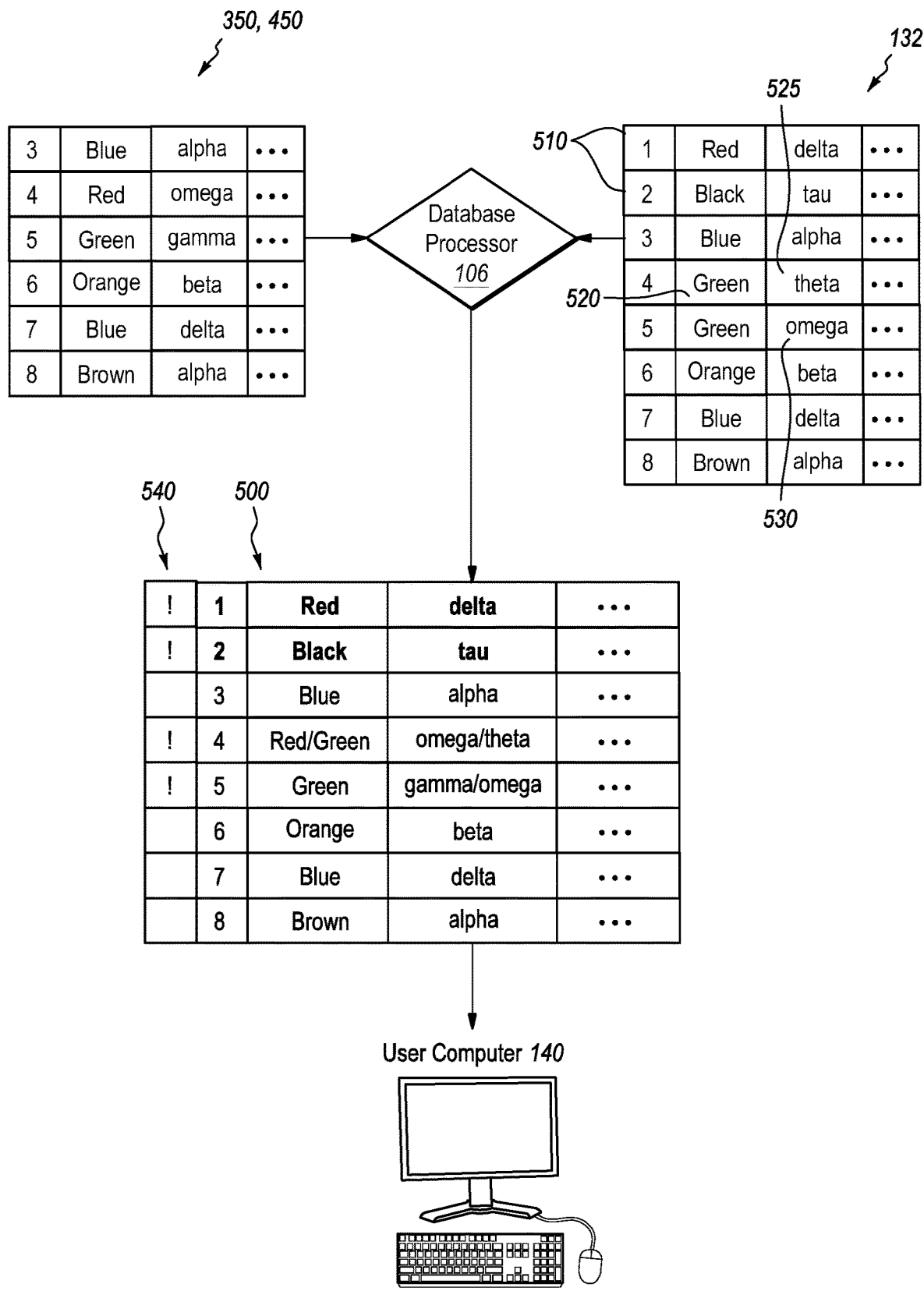
FIG. 5 illustrates a schematic diagram of database processor in accordance with implementations of the present invention.

FIG. 5 depicts a schematic diagram of the database processor 106 validating non-uniformly stored data 350, 450 received from the webservers 110 with data stored within the local database device 130. In this example, the non-uniformly stored data 350, 450 received from the webservers is consistent with the data depicted in FIGS. 3 and 4. The data 132 received from the local database device 130, however, is not completely consistent with the non-uniformly stored data 350, 450. As such, the database processor 106 can generate a report 500 that comprises indications of the discrepancy.

In at least one implementation, the report may comprise a notification indicator 540 that indicates user specific entries that were not validated. For example, both entry 1 and 2 were not present in the non-uniformly stored data 350, 450 received from the webservers 110. Additionally, the data elements associated with data entry 4 are not consistent between the data sets 132, 350, 450. In particular, the non-uniformly stored data 350, 450 indicates that entry 4 should be associated with red and omega. In contrast, the data entry for the locally stored dataset 132 indicates that entry 4 should be associated with green and theta. Further, data entry 5 comprises inconsistency between gamma and omega. In various implementations, this information can be displayed to a user on user computer 140, in a printout, or in some other form.

As such, implementations of the present invention provide methods and systems for efficiently accessing non-uniformly store data within webpages and for reducing human error when gathering and validating the data. Based upon the above disclosure, one will understand that the present invention is both highly adaptable and highly extendable. For example, in at least one implementation, the server computer system 100 of FIG. 1 can be utilized to batch-process a large number of different data requests.

For example, in at least one implementation, a client may be interested in validating a series of invoices with several different third parties. A user of the server computer system 100 can simply load a data file containing a list of the invoices of interest along with data associating the invoices of interest with various third-party web portals. Once the target information is loaded, the user can simply execute the server computer system 100.

The server computer system 100 can automatically associate the invoices and third-party information's with specific servers 110 and accompanying webpages. For instance, the network communication device 102 can access a particular third-party webpage that is associated with one of the above-received third parties. The network communication device 102 can then navigate within the third party web portal.

In particular, the scripting processor 104 can execute a webpage-specific script associated with the third-party web portal. The webpage-specific script can identify the proper username and password associated with the client, enter the username and password, and begin to gather data and navigate the webpage as described above. Once the desired data has been gathered from the webpage, the network communication device 102 can access the next third-party web portal associated with the above entered data. The process can then continue until all of the web portals and all of the invoice data of interest has been gathered.

Once all of the data of interest has been gathered, the database processor 106 can validate each individual and respective invoice against the client's locally provided information. As such, in at least one implementation, different webpage specific scripts can be used in series with each other to access a set of different third-party webpages and gather data from each of them. Additionally, in at least one implementation, the same webpage specific scripts can be used by multiple different clients to search for distinct datasets.

Accordingly, implementations of the present invention provide several unique and novel benefits to the technical field. In particular, implementations of the present invention provide technical methods of creating webpage specific scripts that can later be used to navigate a variety of unique webpages and to gather non-uniformly available data. Additionally, implementations of the present invention provide benefits in efficiency and reduce human-introduced error within large-scale data processing methods and systems.

Accordingly, FIGS. 1-5 and the corresponding text illustrate or otherwise describe one or more methods, systems, and/or instructions stored on a storage medium for intelligently loading and verifying data available in non-uniform formats against a second set of data. One will appreciate that implementations of the present invention can also be described in terms of methods comprising one or more acts for accomplishing a particular result. For example, FIG. 6 and the corresponding text illustrates flowcharts of a sequence of acts and a method for loading and verifying data stored in non-uniform formats against a second set of data. The acts of FIG. 6 are described below with reference to the components and modules illustrated in FIGS. 1-5.

Figure 6:
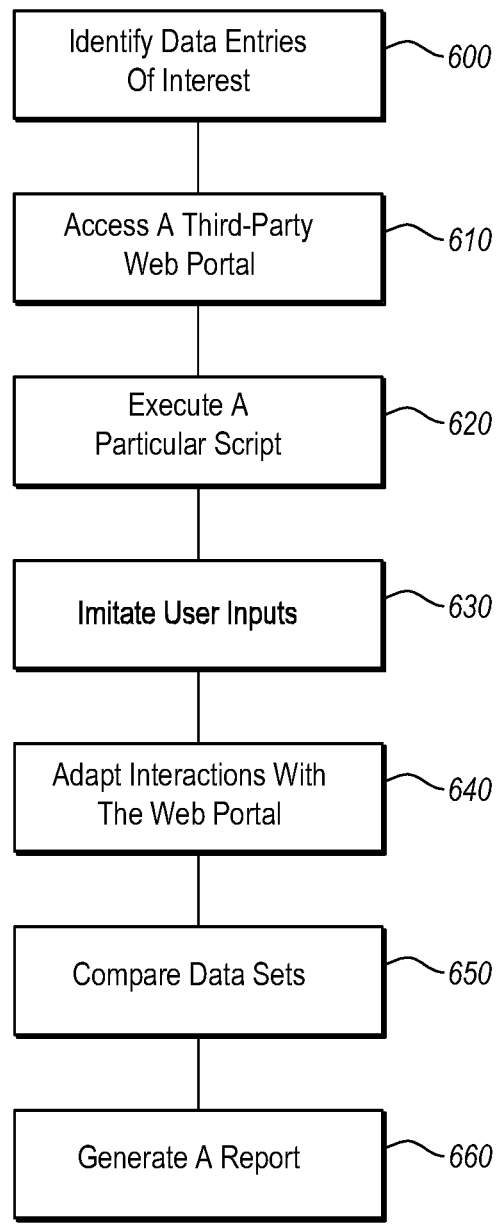
FIG. 6 depicts a flow chart of a method in accordance with implementations of the present invention.

For example, FIG. 6 illustrates a flow chart for an implementation of a method for intelligently loading and verifying data stored in non-uniform formats. The method can comprise an act 600 of identifying data entries of interest. Act 600 can include identifying, within one or more data structures, specific data entries of interest. The one or more data structures can be stored within a first locally accessible database. For example, FIG. 1 depicts a local database device 130 that can comprise locally stored information. Locally stored information can include client-specific user names and passwords, client-specific invoices of interest, client-specific third-party portals of interest, and other similar client-specific information. In at least one implementation, the server computer system 100 can access the information stored within the local database device 130 and use this information to gather data.

FIG. 6 also shows that the method can include an act 610 of accessing a third-party web portal. Act 610 can comprise accessing a third-party web portal that includes information associated with the one or more data structures. For example, FIG. 1 depicts a network communication device 102. The network communication device 102 can access a number of webservers 110 and identified third-party web portals of interest.

Additionally, FIG. 6 shows that the method can include an act 620 of executing a particular script. Act 620 can comprise executing a particular script that is unique to the particular third-party web portal. For example, FIG. 1 depicts a script creation module 108 that can be used to create webpage-specific scripts. Once a particular webpage is accessed, the scripting processor 104 can execute the previously created webpage-specific script.

FIG. 6 also shows that the method can include an act 630 of imitating user inputs. Act 630 can comprise interacting with the particular third-party web portal by imitating inputs from a user input device. For example, the script creation module 108 can record a user's interactions with the webpage. The recorded interactions can include mouse movements, keyboard presses, and other similar user interactions. The script creation module 108 can encode these interactions within a webpage-specific script. Later when accessing the specific webpage, the scripting processor 104 can execute the script such that the previously recorded user interactions are imitated by the scripting processor 104.

In addition, FIG. 6 shows that the method can include an act 640 of adapting interactions with the web portal. Act 640 can comprise automatically adapting interactions with the particular third-party web portal to access and parse data elements from one or more non-uniformly available data fields. For example, FIG. 3 and FIG. 4 depict equivalent datasets available in different, non-uniform manners. In at least one implementation, the scripting processor 104 can automatically adapt interactions with the webpage 300, 400 by identifying special objects. In particular, FIG. 3 comprises special objects 332, 334, 336 that control a scroll field within the webpage 300. In at least one implementation, the scripting processor 104 can automatically adapt to scrolling the scrollbar 330 as necessary to access all of the data.

Further, FIG. 6 shows the method can include an act 650 of comparing data sets. Act 650 can comprise comparing a first set of data received from the one or more non-uniformly available data fields with the second set of data, which is stored within a second locally accessible database. For example, FIG. 5 depicts a first set of data 300 that is equivalent to the non-uniformly store data of FIGS. 3 and 4. The database processor 106 can compare the first set of data 300 against the locally accessible data set 132. In at least one implementation, the locally accessible data set 132 is stored within the local database device 130, a different local storage device, or is otherwise locally available through a network connection.

Further still, FIG. 6 shows that the method can include an act 660 of generating a report. Act 660 can comprise generating report based upon the compared data. The report can comprise notifications of discrepancies between the first set of data and the second set of data. For example, FIG. 5 depicts a report 500 that validates and compares the information of the first data set 300 and the locally stored dataset 132. As described above, the generated report 500 comprises indications of discrepancies between the two data sets.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RANI and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Some embodiments, such as a cloud-computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A computer-implemented method for intelligently loading and verifying data in non-uniform formats against a second set of data, the method executed on a computer system comprising one or more processors, the method comprising:

accessing a particular third-party software portal;
executing computer code that is unique to the particular third-party software portal, wherein the computer code performs the method of:
  interacting with the particular third-party software portal by imitating inputs from a user input device; and
  automatically adapting interactions with the particular third-party software portal to access and parse data elements from one or more data fields;
comparing a first set of data received from the one or more data fields with the second set of data, wherein the second set of data comprises specific data entries of interest that are stored within a first locally accessible database; and
generating a report based upon a comparison of the first set of data and the second set of data.

2. The computer-implemented method as recited in claim 1, wherein the one or more data fields comprise non-uniformly available data fields.

3. The computer-implemented method as recited in claim 2, wherein the non-uniformly available data fields comprise a first portion of data fields that are available for parsing and a second portion of data fields that require a software interaction prior to being available for parsing.

4. The computer-implemented method as recited in claim 1, further comprising:
  accessing the second set of data from within a first locally stored data file, wherein the second set of data comprises one or more invoices;
  identifying a data entry and associated data elements within the first set of data;
  determining that one or more of the data elements differ from the data elements of a corresponding data entry within the second set of data; and
  generating a report identifying the data elements that differ.

5. The computer-implemented method as recited in claim 1, further comprising:
  receiving an indication to compare records for a particular client;
  accessing within a data store the specific data entries of interest, wherein the specific data entries of interest comprise one or more third-party software portals that are associated with the particular client;
  automatically accessing each of the one or more third-party software portals; and
  automatically executing on each of the one or more third-party software portals a script that is unique to each respective third-party software portal.

6. The computer-implemented method as recited in claim 1, further comprising creating the computer code, wherein creating the computer code comprises:
  activating a record feature within the computer system, wherein the record feature captures one or more input signals and one or more output signals between a user and the computer system;
  capturing and recording the one or more input signals received from a user mouse and a user keyboard, wherein the one or more input signals comprise one or more third-party software portal addresses;
  capturing and recording output signals received from one or more third-party software portals associated with the one or more third-party software portal addresses, wherein the one or more output signals comprise one or more webpages that are displayed in response to the one or more input signals;
  identifying one or more output signals that are associated with respective input signals; and
  identifying the one or more data fields.

7. The computer-implemented method as recited in claim 6, further comprising:
  receiving, from a user, an indication regarding a particular element within a webpage, wherein the particular element is associated with a data field; and
  mapping the particular element to a particular data field within the second set of data.

8. The computer-implemented method as recited in claim 7, wherein executing the computer code comprises:
  automatically generating commands to move the user mouse in accordance with the one or more input signals; and
  after causing one or more commands to be issued, waiting until a corresponding output signal is received, wherein the corresponding output signal corresponds with a previously captured and recorded output signal.

9. The computer-implemented method as recited in claim 8, further comprising:
  identifying the particular element within the webpage;
  parsing one or more data elements from a data field positionally associated with the particular element in the webpage;
  accessing the particular data field within the second set of data; and
  identifying discrepancies between the parsed one or more data elements and data elements from the particular data field.

10. The computer-implemented method as recited in claim 9, wherein parsing the one or more data elements comprises parsing the one or more data elements that are not visible on the webpage but are present within local memory.

11. The computer-implemented method as recited in claim 9, further comprising:
  identifying one or more elements from the data field positionally associated with the particular element in the webpage that are not visible on the webpage and are not present within local memory;
  automatically adapting interactions with the particular third-party software portal by identifying a data field advancement element, wherein the data field advancement element comprises a command to display additional elements within the data field;
  activating the data field advancement element by imitating one or more user inputs; and
  parsing one or more data elements that were not previously visible on the webpage but are now visible due to an advancement of the data field.

12. A computer system for intelligently loading and verifying data in non-uniform formats against one or more invoices, comprising:
  one or more processors; and
  one or more computer-readable media having stored thereon executable instructions that when executed by the one or more processors configure the computer system to perform at least the following:
    access a particular third-party software portal;
    execute computer code that is unique to the particular third-party software portal, wherein the computer code configures the computer system to:
      interact with the particular third-party software portal by imitating inputs from a user input device; and automatically adapt interactions with the particular third-party software portal to access and parse data elements from one or more data fields;

compare a first set of data received from the one or more data fields with the one or more invoices, wherein the one or more invoices comprise specific data entries of interest that are stored within a first locally accessible database; and generate a report based upon a comparison of the first set of data and the one or more invoices.

13. The computer system as recited in claim 12, wherein the executable instructions include instructions that are executable to configure the computer system to:

capture and record one or more input signals received from a user mouse and a user keyboard, wherein the one or more input signals comprise one or more third-party web portal addresses;

capture and record one or more output signals received from one or more third-party web portals associated with the one or more third-party web portal addresses, wherein the one or more output signals comprise one or more webpage elements that are displayed in response to the one or more input signals;

identify the one or more output signals that are associated with respective input signals; and identify the one or more data fields.

14. The computer system as recited in claim 13, wherein the executable instructions include instructions that are executable to configure the computer system to:

receive, from a user, an indication regarding a particular element within a webpage, wherein the particular element is associated with a data field; and map the particular element to a particular data field within the one or more invoices.

15. The computer system as recited in claim 14, wherein the executable instructions include instructions that are executable to configure the computer system to:

automatically generate commands to move a mouse in accordance with the one or more input signals; and after causing one or more commands to be issued, wait until a corresponding output signal is received, wherein the corresponding output signal corresponds with a previously captured and recorded output signal.

16. The computer system as recited in claim 15, wherein the executable instructions include instructions that are executable to configure the computer system to:

identify the particular element within the webpage;

parse one or more data elements from a data field positionally associated with the particular element in the webpage;

access the particular data field within the one or more invoices; and identify discrepancies between the parsed one or more data elements and data elements from the particular data field.

17. The computer system as recited in claim 16, wherein the executable instructions include instructions that are executable to configure the computer system to:

identify one or more elements from the data field positionally associated with the particular element in the webpage that are not visible on the webpage and are not present within local memory;

automatically adapt interactions with a particular third-party web portal by identifying a data field advancement element, wherein the data field advancement element comprises a command to display additional elements within the data field;

activate the data field advancement element by imitating one or more user inputs; and parse one or more data elements that were not previously visible on the webpage but are now visible due to the advancement of the data field.

18. The computer system as recited in claim 17, further comprising one or more web-portal specific scripts that are executed once an associated webpage is accessed.

19. The computer system as recited in claim 17, wherein the executable instructions include instructions that are executable to configure the computer system to:

recognize text, using character recognition algorithms, within one or more images on a webpage, wherein the computer system incorporates information from the recognized text into one or more scripts.

20. A computer program product for accessing and comparing non-uniformly stored data sets, the computer program product for use at a computer system, the computer program product comprising one or more computer storage media having stored thereon computer-executable instructions that, when executed at a processor, cause the computer system to:

access a particular third-party software portal;

execute computer code that is unique to the particular third-party software portal, wherein the computer code configures the computer system to:

interact with the particular third-party software portal by imitating inputs from a user input device; and automatically adapt interactions with the particular third-party software portal to access and parse data elements from one or more data fields;

compare a first set of data received from the one or more data fields with one or more invoices, wherein the one or more invoices comprise specific data entries of interest that are stored within a first locally accessible database; and generate a report based upon a comparison of the first set of data and the one or more invoices.

* * * * *